Figure 1:
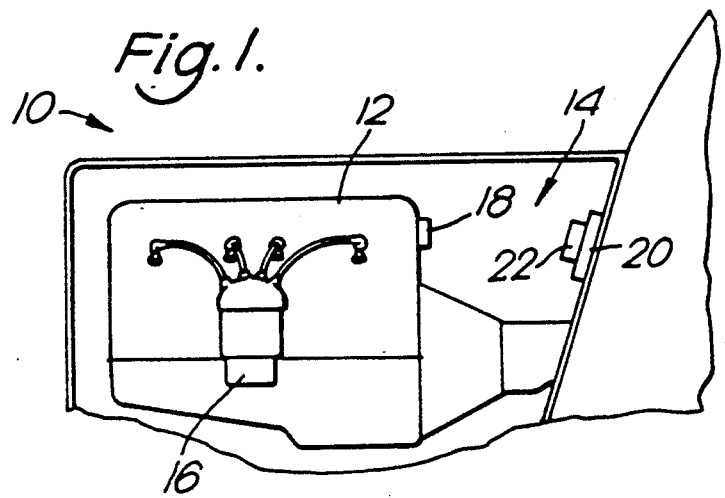

United States Patent [19]

Dutkiewicz et al.

[11] Patent Number: 5,027,774
[45] Date of Patent: Jul. 2, 1991

[54] SPARK IGNITION ENGINES

[75] Inventors: Ryszard K. Dutkiewicz; Teodors Priede, both of Cape Town, South Africa

[73] Assignee: Engineering Research (Proprietary) Limited, Cape Town, South Africa

[21] Appl. No.: 477,086

[22] Filed: Feb. 8, 1990

[30] Foreign Application Priority Data

Feb. 8, 1989 [ZA] South Africa ............ 88/5809

[51] Int. Cl.$^5$ .................. F02P 5/14; G01M 15/00
[52] U.S. Cl. ................................... 123/425; 73/35
[58] Field of Search ............... 123/425, 435; 73/35, 73/116, 488

[56] References Cited

U.S. PATENT DOCUMENTS

| | | | |
|---|---|---|---|
| 4,061,116 | 12/1977 | Saida et al. | 123/425 |
| 4,274,379 | 6/1981 | Iwata et al. | 123/425 |
| 4,290,398 | 9/1981 | Hattori et al. | 123/425 |
| 4,337,640 | 7/1982 | Muranaka et al. | 73/35 |
| 4,387,588 | 6/1983 | Kaji | 73/35 |
| 4,408,479 | 10/1983 | Asai et al. | 73/35 |
| 4,452,079 | 6/1984 | Tiller | 73/488 |
| 4,498,331 | 2/1985 | Nakamura et al. | 73/35 |
| 4,523,566 | 6/1985 | Kobayashi | 123/425 |
| 4,664,083 | 5/1987 | Nix et al. | 123/425 |
| 4,667,637 | 5/1987 | Staerzl | 123/435 |

FOREIGN PATENT DOCUMENTS

| | | |
|---|---|---|
| 0043010 | 4/1977 | Japan ............ 123/425 |
| 2022828 | 12/1979 | United Kingdom . |
| 2049238 | 12/1980 | United Kingdom . |
| 2169959 | 7/1986 | United Kingdom . |

OTHER PUBLICATIONS

T. Priede and R. K. Dutkiewicz, The Effect of Normal Combustion and Knock on Gasoline Engine Noise, SAE Technical Paper Series, Reprinted from Noise and Vibration conference, Michigan, May 1989.
A. E. W. Austen et al., Origins of Diesel Engine Noise, pp. 19-32, Nov. 1957.
T. Priede, Relation Between Form of Cylinder-Pressure Diagram and Noise in Diesel Engines, Proc Instn Mech Engrs (A.D.) No. 1, Jan. 1960, pp. 63-77.
D. Anderton et al., Origins of Reciprocating Engine Noise—Its Characteristics, Prediction, and Control, The American Society of Mechanical Engineers, New York, Nov. 1970.
D. Anderton et al., The Automotive Diesel Engine—Its Combustion, Noise and Design, Institute of Sound and Vibration Research, Univ. of Southampton, Jan. 1977, pp. 123-137.
M. F. Russell et al., Combustion Noise from High Speed Direction Injection Diesel Engines, SAE Technical Paper Series, Michigan, May 1985.
J. A. Raff et al., A Primary Noise Generation Mechanism in Petrol Engines, Instn Mech Engrs, Conference Publication 19, Jul. 1973, pp. 60-72.
T. Hayashi et al., Photographic Observation of Knock with a Rapid Compression and Expansion Machine, SAE Technical Paper Series, Maryland, Oct. 8, 1984, pp. 1-13.
R. Hickling et al., Knock-Induced Cavity Resonances in Open Chamber Diesel Engine, J. Acoustical Society of America 65(6), Jun. 1979, pp. 1474-1479.

Primary Examiner—Willis R. Wolfe
Attorney, Agent, or Firm—Browdy and Neimark

[57] ABSTRACT

There is described a motor vehicle having a spark ignition engine in an engine compartment and having automatic advance and retard device to advance or retard the angle of the firing of the spark relative to the top dead center of the pistons in the cylinders of the spark ignition engine. The engine has a control device including a microphone carried on a vibration damping mounting on the vehicle close to the engine to detect sounds emitted during the running of the vehicle. A frequency filter is connected to the microphone connected to the detector to permit transmission of sound only in a narrow band of sound frequencies between 4,000 and 20,000 Hz which correspond to the sound range of sounds caused by knock. The output from the filter is compared with a datum and when this exceeds such datum, the automatic advance and retard is retarded to prevent knock continuing.

7 Claims, 1 Drawing Sheet

SPARK IGNITION ENGINES

This invention relates to spark ignition engines and is concerned with the control of such engines. In particular the invention is concerned with the control of a spark ignition engine (hereinafter referred to as a "SIE") to prevent pre-ignition (generally known as "knock" or "pinking") in such engines.

Knock if of sufficient magnitude can lead to damage to the engine and on occassions this can be rapid and catastrophic. On the other hand with high compression engines, the most efficient operation of the engine takes place when firing takes place well advanced of top dead centre (hereinafter referred to as "TDC") of the pistons in the cylinders of the SIE and design of the SIE will be such that the firing takes place at as advanced a position as practical.

Abnormal combustion occurs in the conbustion chamber of the SIE under conditions of operation away from the the designer's desired range of operation. Such conditions would be the result of engine deposits, ignition timiming being moved from the manufacturer's settin or the use of unconventional or off-specification fuels.

It is an object of the invention to provide means for so permitting operation of the SIE as to minimize or to eliminate the possibility of knock occuring in the SIE for sufficient time for the SIE to be damaged.

We have appreciated that the onset of knock produces an almost instantaneous pressure rises from 0.5 to 30 bar which not only excites the engine structure at natural frequencies between 800 and 2000 Hz, but also excites the natural modes of the combustion chamber cavity resulting in large amplitude cylinder pressure oscillation and emitted noise in the frequency range from 6500 and 20000 Hz. This is discussed in full in our paper viz:—Priede and Dutkiewicz "The Effect of Normal Combustion and Knock on Gasoline Engine Noise" published in the Proceedings of S.A.E. 1988 Noise and Vibration Conference pages 222 et seqq (ISB No 0-89883-486-4) the contents whereof are incorporated herein by this reference.

According to one aspect of the invention there is provided a control device for an SIE comprising a narrow band sound dectector, a comparator for comparing the strength of the sound detected by the detect with a datum and signalling means to emit a signal when the strength of the said sound exceeds that of the datum by a predetermined amount.

The invention is intended for use with a SIE as used in a vehicle engine which in use will operate at varying speeds. The comparator will thus preferably have a multiplicity of datums with which to compare to the detected sound, each datum being provided respectively for various ranges of speed of the SIE.

The narrow band sound detector preferably comprises a broad band sound detector (hereinafter called a "BBS detector"), such as a simple microphone, and a frequency filter which permits transmission of sound only in a narrow band of sound frequencies. Preferably the said band is between 200 Hz (two hundred Hertz) and 20 000 Hz (twenty thousand Hertz). Preferably the said narrow band is above 5 000 Hz. The filter is preferably arranged to attenuate the sounds below the lower level of the band, the attenuation being preferably to below −40 dB.

The BBS detector is preferably mounted on the vehicle close to the SIE, preferably being mounted on a vibration damping mounting. Preferably there is further provided a speed detector (hereinafter referred to as the "RPM detector") for determining the revolutions per minute of the SIE, the datum or datums being fed into the comparator being controlled by the speed of the SIE detected by the RPM detector. The RPM detector may be an engine speed transducer that is connected to the engine in order to produce a signal proportional to the engine speed. Alternatively the RPM detector can be a device that measures the frequency of a sound which is a function of the speed of the SIE.

The signal emitted by the comparator may be a warning signal (which may be visual or audible or both) to the driver of the vehicle. Alternatively there may be an automatic advance and retard device (hereinafter called an "AARD") associated with the SIE to advance or retard the angle of the firing of the spark relative to the top dead centre (hereinafter referred to as "TDC") of the pistons in the cylinders of the SIE and the said signal may be transmitted to the AARD to retard the position of the spark. In the former case (i.e. when a warning signal is given) the driver will appreciate that less power must be demanded of the SIE and will alter the throttle setting accordingly. In the latter case, by retarding the AARD the possibility of knocking is avoided.

An embodiment of the invention will now be described with reference to the accompanying drawings.

Figure 2:
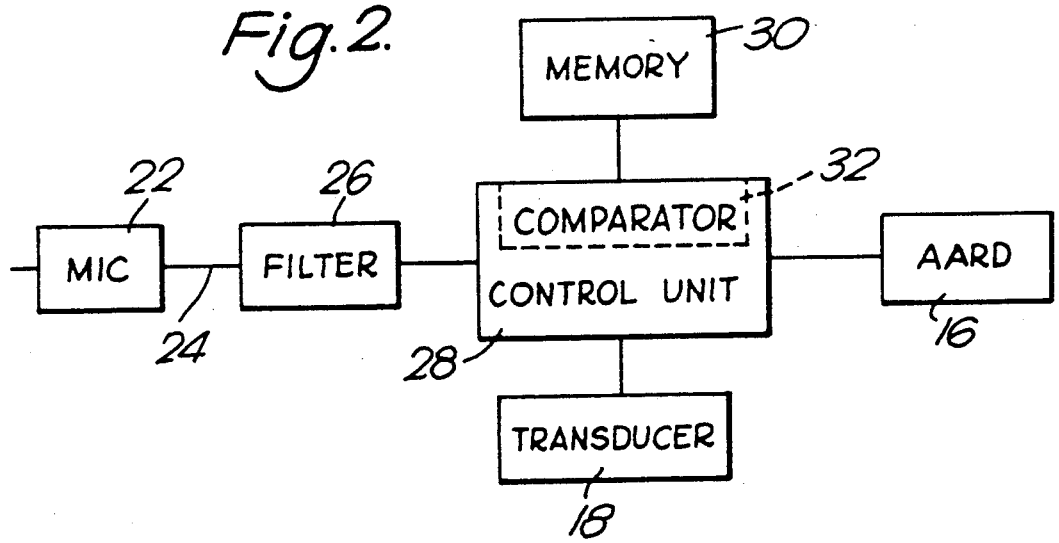

In the drawings:

FIG. 1 is a diagrammatic view of a motor vehicle incorporating a control device of the invention, and FIG. 2 is a block diagram showing the operation of the device.

Referring now to FIG. 1, there is shown a motor vehicle 10 having a spark ignition engine (SIE) 12 in an engine compartment 14. The SIE 12 has an automatic advance and retard device (AARD) 16 in the distributor connected to the spark plugs for determining when in the cycle of each piston in the cylinder, the spark plug fires. The AARD 16 is set at a maximum advance for most efficient running of the SIE 12 and is biassed to this setting. A speed operated transducer (indicated generally at 18) is attached to the SIE 12 to emit a signal determined by the rotational speed of the SIE 12.

Fitted within the engine compartment 14 and resting on a vibration damping pad 20 there is a microphone 22 which is so located as to be able to detect the sounds emitted by the SIE 12. The output 24 of the microphone 22 is connected to a filter device 26 (see FIG. 2) that attenuates sounds emitted by the microphone 22 below 5 550 Hz to least −40 dB. The filter device 26 connects to a control unit 28. This unit 28 incorporates a memory device 30 for emitting a datum signal for each rotational speed (or narrow range of speeds) of the SIE 12. The memory device 30 receives signals from the transducer 18 that determines which datum signal will be emitted thereby. In addition the unit 28 incorporates a comparator 32 that produces a signal and is connected to the AARD 16 to adjust its setting.

When the vehicle 10 is operating, there will be a large range of noises detected by the microphone 22, including road noises, rattles and other sounds incidental to the sound of the SIE 12. In addition the microphone 22 will detect the sounds of the SIE 12 and in particular any sound of the SIE knocking.

We have found that the SIE gives off noises as it commences to knock. We have further found that the sound of the SIE knocking would be in a different frequency range to the other noises detected by the microphone 22 and indeed will be at a higher frequency than such noises. The filter device 26 is arranged to filter out the lower frequency noises so that the only noises that the comparator 32 has to deal with are the relevant noises emitted by the SIE 12 when it commences knocking.

When the SIE 12 is caused to operate under conditions that are different from the designer's desired range of operation, it will start knocking. When this occurs, the comparator 32 detects the noise emitted by the engine on commencing knocking, it actuates the AARD 16 against its bias to retard the angle at which the spark plugs fire until the SIE 12 operates without knocking. When the loading on the SIE 12 falls, the bias on the AARD 16 will allow it to advance the position of the spark so that the engine runs more efficiently. In this way the SIE 12 will be able to run at optimum spark setting during operation.

All the parts described above are known to those skilled in the relevant art, their arrangement and interrelationship however are novel and inventive. With the information herein contained, those skilled in the art can construct, fit in a vehicle and operate a control device as herein described.

The invention is not limited to the precise constructional details hereinbefore described and illustrated in the drawings. For example, instead of, or in addition to the comparator 32 being connected to the AARD 16, it may be connected to a signal light in the cabin of the vehicle and/or to an audible warning device (the signal light and audible warning device being shown diagrammatically at 34 and 36 in FIG. 1). The intention is that when a driver sees or hears the signal given off then he will reduce the power demand on the SIE so that the possibility of knocking is reduced.

Instead of the transducer 18, the speed of the engine may be determined by a device which detects a sound given off by the engine (e.g. on each revolution) during operation. The signal given off by this device may be fed into the control unit to control the operation of the memory device 30.

We claim:

1. A control device for a spark ignition engine comprising
   a narrow band sound detector,
   a comparator having a multiplicity of datums, each datum being provided respectively for various ranges of speed of the engine, the said comparator being arranged to compare the strength of the sound detected by the detector with the datum for a specific range of speeds, and
   signalling means to emit a signal when the strength of the said sound exceeds that of the datum for a specific range of speeds by a predetermined amount.

2. A control device as claimed in claim 1 wherein the filter is arranged to attenuate the sounds below the lower level of the band to below −40 dB.

3. A motor vehicle incorporating
   (a) a body including parts defining an engine compartment,
   (b) a spark ignition engine in said engine compartment, and
   (c) a control device as claimed in claim 1, wherein the broad band sound detector is mounted on the vehicle body within the engine compartment close to the spark ignition engine.

4. A motor vehicle as claimed in claim 3 wherein the broad band sound detector is a microphone is mounted on a vibration damping mounting.

5. A motor vehicle as claimed in claim 3 further comprising
   (d) a speed detector for determining the revolutions per minute of the spark ignition engine, said speed detector being connected to said comparator or that said datum or datums being fed into said comparator are controlled by the speed of the spark ignition engine detected by the speed detector.

6. A motor vehicle incorporating
   (a) an engine compartment,
   (b) a spark ignition engine,
   (c) a narrow band sound detector located on the vehicle but not on the spark ignition engine to detect sounds being emitted by said vehicle, said narrow band being such as to detect substantially only sounds emitted by the spark ignition engine when operating with pre-ignition,
   (d) means for emitting a datum signal depending upon the operating characteristics of said engine,
   (e) a comparator connected to said sound detector and to said datum signal emitting means for comparing the strength of the sound detected by the detector with said datum, and
   (f) signalling means to emit a signal when the strength of the said sound exceeds that of the datum by a predetermined amount.

7. A motor vehicle incorporating,
   (a) an engine compartment;
   (b) a spark ignition engine;
   (c) a microphone located on the vehicle close to said engine, to detect sounds emitted during the running of said vehicle;
   (d) vibration damping mounting means on which said microphone is mounted;
   (e) a frequency filter connected to said detector and to permit transmission of sound only in a narrow band of sound frequencies;
   (f) means for emitting a datum signal depending upon the operating characteristics of said engine,
   (g) a comparator connected to said sound detector through said filter and to said datum signal emitting means for comparing the strength of the sound detected by the detector with said datum; and
   (f) signalling means to emit a signal when the strength of the said sound exceeds that of the datum by a predetermined amount.

* * * * *